UNITED STATES PATENT OFFICE.

ANSEL MOFFATT, OF INDIANAPOLIS, INDIANA.

COMPOSITION OF MATTER.

SPECIFICATION forming part of Letters Patent No. 445,815, dated February 3, 1891.

Application filed November 4, 1890. Serial No. 370,260. (No specimens.)

*To all whom it may concern:*

Be it known that I, ANSEL MOFFATT, a citizen of the United States, residing at the city of Indianapolis, in the county of Marion and State of Indiana, have invented a certain new and useful Composition of Matter to be Used for Covering Walls and other Surfaces; and I do declare the following to be a full, clear, and exact description of the invention, such as will enable others skilled in the art to which it appertains to make and use the same.

My composition consists of the following materials or ingredients combined in substantially the proportions and manner set out, viz: cotton-seed ground, or in the form known as cotton-seed meal, three to fifty pounds; linseed-oil cake ground, one to thirty pounds, according to adhesiveness, plasticity, hardness, and surface to which the composition is to be applied; borax, one-half pound to ten pounds, using as a base one thousand pounds of sand and four hundred pounds of plaster-of-paris, mix and mingle all together thoroughly, then add enough water and mixing further to make a plaster or mortar of the consistency desired.

The composition properly prepared may be applied to brick, stone, iron, wood, or other surfaces as a plaster, base, or finish, adhering with great tenacity, and becoming very hard and durable.

For covering brick walls or similar surfaces a small amount of the cotton-seed meal and the linseed-oil cake ground and the borax will in many instances be all that is desired or required; but by increasing the quantity of these ingredients, as indicated in the proportions named, the tenacity, plasticity, adhesiveness, hardness, and durability may be greatly increased and the composition be made suitable to cover even a rough-sawed board or any similar surface.

I am aware that sand, water, and plaster-of-paris have been used in preparing plaster or mortar; but I am not aware that cotton-seed meal, linseed-oil cake ground, and borax have ever been used in preparing plaster or mortar for the uses indicated; and I am not aware that all of these ingredients of my composition have ever been combined together to be used or used in proportion and manner substantially as specified.

What I claim, and desire to secure by Letters Patent of the United States, is—

The herein-described composition of matter to be used as a plaster or mortar, consisting of cotton-seed ground, or in the form known as cotton-seed meal, linseed-oil cake ground, borax, sand, plaster-of-paris, and water, mixed and compounded in substantially the proportions and manner specified.

In testimony whereof I affix my signature in presence of two witnesses.

ANSEL MOFFATT.

Witnesses:
JOHN T. LECKLIDER,
ANDREW J. DE HAVEN.